UNITED STATES PATENT OFFICE.

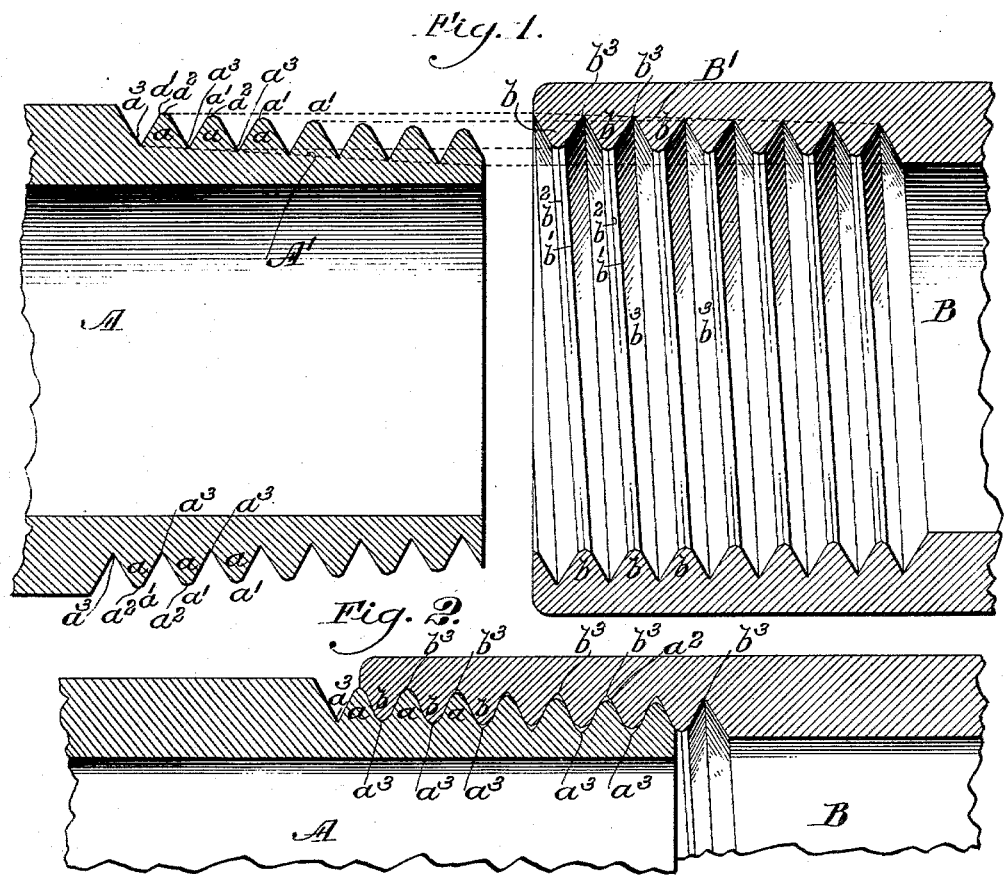

CLINTON A. HIGBEE, OF PHILADELPHIA, PENNSYLVANIA.

SCREW UNION OR COUPLING.

SPECIFICATION forming part of Letters Patent No. 597,000, dated January 11, 1898.

Application filed May 12, 1897. Serial No. 636,151. (No model.)

*To all whom it may concern:*

Be it known that I, CLINTON A. HIGBEE, a citizen of the United States of America, residing in the city and county of Philadelphia, in the State of Pennsylvania, have invented certain new and useful Improvements in Screw Unions or Couplings, of which the following is a true and exact description, reference being had to the accompanying drawings, which form a part thereof.

My invention relates to the construction of screw unions or couplings, by which I mean any screw-union formed between threaded metallic parts.

The object of my invention is to increase the tightness of the joint formed between the male and female members of the coupling, so as to adapt such unions for use in pipes or chambers of any description where gas or liquid is contained under pressure and for which uses screw-joints have heretofore been found unsatisfactory or defective.

While my invention is, as stated, of general application, it is especially adapted for use in pipe-joints, and I have accordingly illustrated it as applied to a pipe-joint.

Heretofore in adapting screw-joints for use in connection with pipes or chambers containing fluid under pressure the leakage of the fluid through the joint has been attempted to be prevented by the nice and accurate fit of the threads upon each other and by the use of various lutings; but as I have already stated the best screw-joints are found to be defective under great pressure, and it is desirable in many if not most cases to avoid the use of any luting for reasons which are familiar.

I have discovered by so forming the threads of the members of a screw-coupling, upon one of which the threads lie as upon the surface of a cone, that in the act of screwing the members together pressure is exerted upon the sides of the threads in such a way as to tend to cause the metal of the thread to flow outward toward the top of the thread, and by forming the bottom of the threads in such a way as to permit of an appreciable flow of the metal toward the top of the thread that not only will the form of the thread be changed by the application of power, but the flowing metal will not only fill the spaces or cavities left to permit its flow, but fill them with a completeness and closeness unattainable in any other way, and which will effectually prevent the passage of high-pressure fluid through the completed joint; and my invention consists in so forming the threads (one or both members of the coupling being cone-shaped, as stated) as to leave between the tops and bottoms or inner and outer apices of the threads an open space into which the metal can flow on the application of power to drive the members together.

Reference being now had to the drawings in which my invention is illustrated, Figure 1 represents the male and female members of a screw pipe-union embodying my invention. Fig. 2 represents the same two members screwed together. Fig. 3 is an enlarged view of some of the upset threads of the union shown in Fig. 2, the original form of the threads being indicated in dotted lines. Fig. 4 is a sectional view indicating the effect of applying my invention to a screw-coupling in which one member is of cast-iron and the other of soft iron, and Fig. 5 is a view indicating a slight modification.

A is the male, and B the female, member of the screw-union. As shown in Figs. 1 and 2, the threads in both members are formed upon conical surfaces, that of the male member (indicated at A') having greater angular divergence from the central line of the coupling than has that of the female member, (indicated at B',) in consequence of which construction the tight joint at which I aim is formed between the outer threads of the female member and the inner threads of the male member, as is clearly indicated in Fig. 2. It will be understood, however, that it would make no difference, so far as my invention is concerned, if the angle of the cone upon which the threads are formed in the male member were less instead of greater than that of the female member, except that the tight joint would then be formed between the inner threads of the female member and the outer threads of the male member. It will also be evident that one of the coupling members may have its threads formed as upon the face of a cylinder instead of as upon a cone, in which case if the cylindrical surface were upon the male member the tight portion of the joint would be formed by the inner threads of the female member, while if the cylindrical member were the female member the tight portion of the joint would necessarily be formed by its outer threads. I have indicated above the possible variations with regard to the conical formation of the members, from which it will be seen that whereas I prefer that both members should have their threads formed upon conical surfaces it is sufficient that either member should be coned.

$a\, a$ indicate the threads, their tops or upper apices being indicated at $a'$ and their bottoms or lower apices at $a^3$. The threads (indicated at $b$) of the female coupling member have their tops indicated at $b'$ and their bottoms indicated at $b^3$. The sides of the threads should be made as is usual, fitting nicely against each other; but in accordance with my invention I either cut away or truncate the tops of the threads, as is indicated in Figs. 1 and 2, or groove the bottoms of the threads, as is indicated in Fig. 5, so that when the coupling members are screwed together an open space is left between the tops and bottoms of the threads. This space may be provided for by the simple expedient of truncating or cutting away the tops of the ordinary V-shaped thread, as is, for instance, indicated at $a^2$ and $b^2$. In the drawings I have indicated a truncation by two planes, which meet and leave a plane point to the truncated thread, but the truncation may be by a single plane, or the ends of the threads may be left of curved form, as may be preferred.

The result of coupling the two members constructed in accordance with my invention is shown in Figs. 2 and 3, and, as clearly appears in Fig. 2, the upsetting of the threads occurs between the outer threads of the female and inner threads of the male coupling, the rest of the threads serving simply to lend strength to the joint, the tightness being effected by the threads which are completely upset to fill the cavities left for the flowing metal. The action upon the metal is indicated and somewhat exaggerated in Fig. 3, where the distortion of the threads and the new outline imparted to them are made clearly apparent by comparison with the dotted lines indicating the original form and relative position of the threads before the upsetting action begins.

In Fig. 4 I have indicated a coupling in which the portion B is cast-iron, while the portion A is of soft malleable metal. The formation of the threads of the two members is, before they are screwed together, substantially like that indicated in Fig. 1; but as the cast metal will not upset or flow the entire distortion necessary to make the tight joint is effected by the flow of metal in the soft-metal member, and I have found by experiment that a satisfactory joint may be made between two members of the different materials mentioned.

The modification indicated in Fig. 5 is an obvious one, the recess for the flow of the metal being formed by a channel at the base of the thread instead of by truncating the top of the thread. This also I have found to give satisfactory results, though, for obvious reasons, I prefer the construction in which the tops of the threads are truncated.

While I prefer in all cases that the angular inclination of the thread-surfaces to each other should be different, a construction which results, as I have explained, in the formation of the tight joint at one end of the coupled threads and the utilization of the remaining threads as packing for the joint, it is quite possible to apply my invention to coupling members in which the threads are formed on cones of the same angular inclination, in which case of course all of the engaged threads are subjected to the upsetting action simultaneously instead of progressively, as is the case when the cones are of different angular inclination.

Having now described my invention, what I claim as new, and desire to secure by Letters Patent, is—

1. A screw-coupling consisting of male and female members one or both members having their threads formed on conical surfaces and said coupling members having also their threads formed to fit against each other on the sides while leaving open spaces between them at the outer and inner apices, all substantially as specified, and so that the screwing together of the members under power will upset the metal of the threads and change the thread form causing the metal to flow into and close the open spaces aforesaid.

2. A screw-coupling consisting of male and female members one or both members having their threads formed on conical surfaces and said coupling members having also their threads formed to fit against each other on the sides while leaving their outer apices truncated so as to leave an open space between them and the inner apices of the coupled thread, all substantially as specified, and so that the screwing together of the members under power will upset the metal of the threads and change the thread form causing the metal to flow into and close the open spaces aforesaid.

3. A screw-coupling consisting of male and female members one or both members having their threads formed as on conical surfaces and said surfaces being of different angular relation to the axes of the coupling, the threads of the coupling members being further characterized by a formation of their apices to leave a space between the tops and bottoms of the threads when screwed together and before the form of the threads is changed and to permit of the change in the form of the threads as the male and female members are screwed together with sufficient force.

4. A screw-coupling consisting of male and female members one or both members having their threads formed as on conical surfaces and said surfaces being of different angular relation to the axes of the coupling, the threads of the coupling members being further characterized by the truncation of their outer apices so as to leave a space between the tops and bottoms of the threads when screwed together and before the form of the threads is changed and to permit of the change in the form of the threads as the male and female members are screwed together with sufficient force.

CLINTON A. HIGBEE.

Witnesses:
    CHARLES F. ZIEGLER,
    D. STEWART.